US011279351B2

(12) United States Patent
Schmidt et al.

(10) Patent No.: US 11,279,351 B2
(45) Date of Patent: Mar. 22, 2022

(54) METHOD AND SYSTEM FOR CONTROLLING A MOTOR VEHICLE

(71) Applicant: TRW Automotive GmbH, Alfdorf (DE)

(72) Inventors: Manuel Schmidt, Dortmund (DE); Christian Wissing, Dortmund (DE); Andreas Homann, Dortmund (DE); Christian Lienke, Dortmund (DE); Torsten Bertram, Düsseldorf (DE); Carlo Manna, Genk (BE); Karl-Heinz Glander, Monheim (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 285 days.

(21) Appl. No.: 16/711,542

(22) Filed: Dec. 12, 2019

(65) Prior Publication Data

US 2020/0189580 A1 Jun. 18, 2020

(30) Foreign Application Priority Data

Dec. 17, 2018 (DE) .......................... 102018132520.7

(51) Int. Cl.
*B60W 30/09* (2012.01)
*B60W 30/095* (2012.01)
*B60W 30/18* (2012.01)

(52) U.S. Cl.
CPC .. *B60W 30/0956* (2013.01); *B60W 30/18163* (2013.01); *B60W 2554/40* (2020.02)

(58) Field of Classification Search
CPC ................................................ B60W 30/0956
See application file for complete search history.

(56) References Cited

U.S. PATENT DOCUMENTS

| | | | | |
|---|---|---|---|---|
| 8,340,883 B2 * | 12/2012 | Arbitmann | ............ | B60W 10/20 701/96 |
| 8,355,842 B2 * | 1/2013 | Arbitmann | ......... | B62D 15/0265 701/41 |
| 8,903,588 B2 * | 12/2014 | Schmudderich | ... | G06K 9/00798 701/23 |
| 8,924,140 B2 * | 12/2014 | Sakamoto | ............. | G01S 13/867 701/301 |

(Continued)

FOREIGN PATENT DOCUMENTS

DE 102014211507 12/2015

*Primary Examiner* — Alex C Dunn
(74) *Attorney, Agent, or Firm* — Tarolli, Sundheim, Covell & Tummino LLP

(57) ABSTRACT

A method is presented for controlling a motor vehicle (10). Initially, driving maneuver data containing information concerning multiple possible, different driving maneuvers of the motor vehicle (10) are generated and/or received. Traffic data containing information concerning at least one undisturbed predicted trajectory of at least one further road user (20, 22, 24) are generated and/or received. An influence of the at least one driving maneuver on the trajectory of the at least one further road user (20, 22, 24) is determined, based on the driving maneuver data and the traffic data, and a characteristic variable is ascertained that describes the influence of the at least one driving maneuver on the at least one further road user (20, 22, 24). In addition, a system (34) for controlling a motor vehicle (10) is proposed.

16 Claims, 2 Drawing Sheets

(56) References Cited

U.S. PATENT DOCUMENTS

| | | | |
|---|---|---|---|
| 9,507,346 B1* | 11/2016 | Levinson | G05D 1/0291 |
| 9,606,539 B1* | 3/2017 | Kentley | G08G 1/005 |
| 9,612,123 B1* | 4/2017 | Levinson | G01C 21/32 |
| 9,632,502 B1* | 4/2017 | Levinson | G06N 20/00 |
| 9,764,736 B2* | 9/2017 | Prokhorov | B60W 30/095 |
| 10,019,011 B1* | 7/2018 | Green | B60W 30/0953 |
| 10,059,335 B2* | 8/2018 | Newman | B60W 10/04 |
| 10,431,092 B2* | 10/2019 | Buburuzan | G05D 1/021 |
| 10,543,852 B2* | 1/2020 | Marcoux | B60W 50/0097 |
| 10,964,216 B2* | 3/2021 | Buburuzan | B60W 30/09 |
| 11,175,671 B2* | 11/2021 | Green | G05D 1/0221 |
| 2008/0161986 A1* | 7/2008 | Breed | G01S 19/48 |
| | | | 701/23 |
| 2009/0076702 A1* | 3/2009 | Arbitmann | B60W 10/20 |
| | | | 701/96 |
| 2016/0368492 A1* | 12/2016 | Al-Stouhi | G08G 1/162 |
| 2017/0291608 A1* | 10/2017 | Engel | G08G 1/096741 |
| 2018/0349713 A1* | 12/2018 | Jiang | B60W 30/00 |
| 2019/0243381 A1* | 8/2019 | Strunck | G05D 1/0289 |
| 2019/0346845 A1* | 11/2019 | Rottkamp | B62D 15/0265 |
| 2020/0110414 A1* | 4/2020 | Dupre | B60W 30/18154 |

* cited by examiner

METHOD AND SYSTEM FOR CONTROLLING A MOTOR VEHICLE

RELATED APPLICATION

This application claims priority from German Application No. 10 2018 132 520.7, filed Dec. 17, 2018, the subject matter of which is incorporated herein by reference in its entirety.

BACKGROUND OF THE INVENTION

The invention relates to a method for controlling a motor vehicle, a control unit for a system for controlling a motor vehicle, a system for controlling a motor vehicle, a computer program for carrying out the method, and a computer-readable data medium that has such a computer program.

One of the main challenges for driving assistance systems that control a longitudinal motion and a transverse motion of a motor vehicle in a partially automated manner, and in particular for motor vehicles that travel in a completely automated manner, is to analyze a specific situation that the motor vehicle is in, and based on this analysis to derive and select appropriate, meaningful driving maneuvers for the motor vehicle.

Typically, multiple different driving maneuvers are initially determined, from which one is then selected which is used for controlling the motor vehicle. However, systems known from the prior art for controlling motor vehicles are not able to incorporate the effects of a driving maneuver on other road users into the decision that is made.

SUMMARY OF THE INVENTION

The object of the invention is to provide a method and a system for controlling a motor vehicle in which the disadvantages of the prior art are eliminated.

The object is achieved according to the invention by a method for controlling a motor vehicle traveling on a roadway in a current lane, the roadway having at least one additional lane that is adjacent to the current lane in which the motor vehicle is traveling. Driving maneuver data containing information concerning multiple possible, different driving maneuvers of the motor vehicle are initially generated and/or received. Traffic data containing information concerning at least one undisturbed predicted trajectory of at least one further road user situated in predefined surroundings of the motor vehicle are generated and/or received, in particular information concerning undisturbed predicted trajectories of multiple further road users in the surroundings of the motor vehicle. Based on the driving maneuver data and the traffic data, an influence of the at least one driving maneuver on the trajectory of the at least one further road user, in particular on the trajectories of the multiple road users, is determined. Based on the determined influence, a characteristic variable is ascertained that describes the influence of the at least one driving maneuver on the at least one further road user.

Thus, according to the invention, an interaction between the motor vehicle and the at least one further road user is taken into account by ascertaining an influence of the possible driving maneuvers on the trajectory of the at least one further road user. To make this influence measurable or assessable, a characteristic variable is ascertained which, as a function of the particular driving maneuver of the motor vehicle and as a function of a deviation of the at least one further road user from the predicted trajectory, has a different value or a different group of values.

In particular, for each possible driving maneuver a simulation of the roadway traffic situation is carried out to ascertain the influence of the various possible driving maneuvers on the trajectory of the at least one further road user.

The undisturbed predicted trajectories, the various possible driving maneuvers of the motor vehicle, and/or corresponding trajectories of the motor vehicle are inputs for the simulation. As an output, the simulation generates adapted predicted trajectories for the further road users, the adapted predicted trajectories containing the responses of the further road users to the driving maneuver of the motor vehicle in question. Accordingly, for ascertaining the characteristic variable, a deviation of the adapted predicted trajectory of the at least one further road user from the undisturbed predicted trajectory of the at least one further road user is taken into account.

Here and in the following discussion, "undisturbed predicted trajectory" is understood to mean the trajectory that the least one further road user would follow if the motor vehicle remained in the current lane with unchanged speed.

Here and in the following discussion, "influence" is understood to mean any deviation of the at least one further road user from his/her undisturbed predicted trajectory, for example a change in the speed, the direction, and/or the lane.

The characteristic variable is preferably determined for multiple, in particular for all, of the possible driving maneuvers. A comparison of the multiple possible driving maneuvers based on the ascertained characteristic variable is thus possible. In other words, the various possible driving maneuvers may thus be assessed based on the particular ascertained characteristic variable.

One aspect of the invention provides that, based on the ascertained characteristic variable, one of the multiple driving maneuvers is selected and the motor vehicle is controlled according to the selected driving maneuver, in particular the selected driving maneuver being an optimal driving maneuver. Here and in the following discussion, "optimal driving maneuver" is understood to mean that the characteristic variable that corresponds to the driving maneuver satisfies a certain criterion. For example, the characteristic variable has a value or a group of values that is within a predefined interval, in particular is greater or lesser than a predefined limit value. Thus, according to the invention, the interaction of the motor vehicle with the at least one further road user is taken into account when selecting the driving maneuver that is used for controlling the motor vehicle.

According to one embodiment of the invention, the characteristic variable includes a cost function that maps the particular driving maneuver and/or a change in the undisturbed predicted trajectory onto a cost factor, in particular the cost factor being greater when the at least one further road user must decelerate, change direction, and/or change lanes. The cost factor represents an easily interpretable variable, since a driving maneuver is more favorable the lower the cost factor.

In particular, the cost function is a cost functional that depends on the particular trajectories of the motor vehicle and of the at least one further road user, and preferably depends on the trajectories of all further road users in a predefined surroundings of the motor vehicle.

The cost function is preferably minimized in order to select the driving maneuver. As mentioned, since the cost factor is smaller the more favorable the driving maneuver in question, the optimal driving maneuver may thus be easily determined.

It is pointed out that in another possible definition of the cost function, for example for a cost function that is multiplied by −1, the cost function must be maximized in order to select the driving maneuver. However, the definition of the cost function selected above corresponds to the intuitive understanding of a cost factor (the more favorable the driving maneuver, the lower the corresponding cost factor).

In addition, the cost function preferably includes the kinetic energies of the motor vehicle and of the at least one further road user. It has been found that the kinetic energies represent a particularly suitable variable for describing the influence of the individual driving maneuvers and in general, the interaction of the particular driving maneuvers with the at least one further road user.

In particular, a longitudinal speed and a lateral speed of the motor vehicle or of the at least one further road user, in each case with respect to the roadway, are included in the kinetic energies of the motor vehicle and of the at least one further road user. Accordingly, lane change maneuvers may be mapped and taken into account by means of the kinetic energy.

According to another embodiment of the invention, the cost function includes a change in the kinetic energies, i.e., the kinetic energy of the motor vehicle and/or of the at least one further road user, between the particular possible driving maneuver and a situation in which the motor vehicle remains in the current lane with unchanged speed. Accordingly, the kinetic energies are each compared to the undisturbed situation in which the motor vehicle does not disturb the trajectory of the at least one further road user. This undisturbed situation is thus used for all possible driving maneuvers as a shared reference.

In particular, for calculating the kinetic energies of different types of road users, a different, normalized mass is used for each type of road user. Here and in the following discussion, "type of road user" is understood to mean a classification of the particular road user into one of the following classes: passenger vehicle, truck, motorcycle, bicycle, and pedestrian. Of course, some other classification of the classes is possible, and/or additional classes may be provided. As the result of introducing standardized masses, the handling of different types of road users is simplified, and the different braking and acceleration capabilities of different types of road users may also be taken into account. In particular, passenger vehicles, trucks, motorcycles, bicycles, and pedestrians, etc., have different standardized masses.

Another aspect of the invention provides that the cost function includes a penalty term for forced lane changes by the at least one further road user. Use of this penalty term takes into account that the at least one further road user in the normal case does not intend to maintain his/her current lane and speed. A forced change of lane is taken into account by increasing the cost factor by means of the penalty term.

At least the current lane and/or the at least one additional lane may be transformed into a Frenet-Serret coordinate system. In this coordinate system each roadway is free of curves, so that each roadway traffic situation may be handled in the same way, regardless of the actual course of the roadway. In particular, the above-described driving maneuvers of the motor vehicle are treated as trajectories in this Frenet-Serret coordinate system. In addition, the trajectory of the at least one further road user is also treated in this coordinate system.

The possible driving maneuvers are preferably optimized individual driving maneuvers. There are different classes of driving maneuvers, depending on the traffic situation in which the motor vehicle is in. These classes may differ, for example, in the exact path that the motor vehicle takes. The optimized individual driving maneuvers are the optimal individual driving maneuvers of their particular class, i.e., the space-time trajectory that corresponds to the individual driving maneuvers, that satisfies/satisfy predefined conditions. In particular, the individual driving maneuvers must be free of collisions and must be performable by the motor vehicle. The individual driving maneuver may also satisfy further conditions, for example having the shortest possible duration and/or requiring no accelerations that exceed a predefined limit value. The optimized individual driving maneuvers may then be used as input for ascertaining the characteristic variable.

According to another embodiment of the invention, at least one sensor detects at least portions of the current lane and/or of the additional lane in order to ascertain the driving maneuvers of the motor vehicle, generate the traffic data, and/or predict the trajectory of the at least one further road user. The at least one sensor generates appropriate surroundings data that are used to generate the driving maneuver data and/or the traffic data.

The at least one sensor may be a camera, a radar sensor, a distance sensor, a LIDAR sensor, and/or any other type of sensor that is suitable for detecting the surroundings of the motor vehicle.

Alternatively or additionally, the at least one sensor may be designed as the interface with a guidance system that is associated with at least the section of the roadway in which the motor vehicle is currently traveling. The guidance system is designed to transmit surroundings data to the motor vehicle and/or to the further road users via the roadway and/or via the further road users, in particular via their predicted trajectories.

The object is further achieved according to the invention by a control unit for a system for controlling a motor vehicle, the control unit being designed to carry out a method described above. With regard to the advantages and the other possible features of the control unit, reference is made to the above discussion concerning the method.

The control unit may be part of the motor vehicle or part of a higher-level system, for example part of the guidance system.

The object is further achieved according to the invention by a system for controlling a motor vehicle, having a control unit described above. With regard to the advantages and the other possible features of the control unit, reference is made to the above discussion concerning the method.

The object is further achieved according to the invention by a computer program having program code means for carrying out the steps of a method described above when the computer program is executed on a computer or a corresponding processing unit, in particular a processing unit of a control unit described above. With regard to the advantages, reference is made to the above discussion concerning the method.

Here and in the following discussion, "program code means" are computer-executable instructions in the form of program code and/or program code modules in compiled and/or uncompiled form, which may be present in any given programming language and/or machine language.

The object is further achieved according to the invention by a computer-readable data medium on which a computer program described above is stored. The data medium may be an integral component of the control unit described above, or may be separate from the control unit. The data medium has a memory in which the computer program is stored. The memory is any given suitable type of memory based, for example, on magnetic and/or optical data storage.

BRIEF DESCRIPTION OF THE DRAWINGS

Further advantages and characteristics of the invention result from the following description and the appended drawings, to which reference is made. In the drawings.

DESCRIPTION

Figure 1:
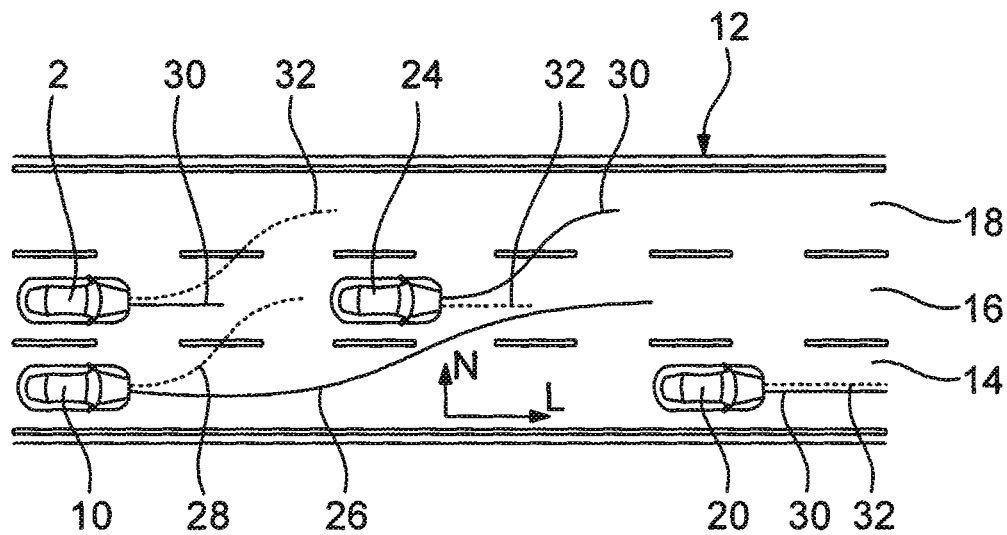
FIG. 1 schematically shows a roadway traffic situation.

FIG. 1 schematically shows a roadway traffic situation in which a motor vehicle 10 is traveling on a roadway 12 in a current lane 14. Next to the current lane 14 is a first additional lane 16, which in turn is next to a second additional lane 18.

Also traveling on the roadway 12 are a first further road user 20 in the current lane 14, in front of the motor vehicle 10, and a second further road user 22 and a third further road user 24 in the first additional lane 16. In the example shown, the further road users 20, 22, 24 are passenger vehicles, although they could also be trucks, motorcycles, or any other given road users.

The solid lines 26 and the dashed lines 28 in FIG. 1 are examples of two different driving maneuvers that the motor vehicle 10 may carry out in order change lanes and pass the first further road user 20.

Similarly, the solid lines 30 and the dashed lines 32 emanating from the further road users 20, 22, 24 indicate corresponding responses by the further road users 20, 22, 24 to the driving maneuvers which make it possible for the motor vehicle 10 to carry out the driving maneuver in question.

Figure 2:
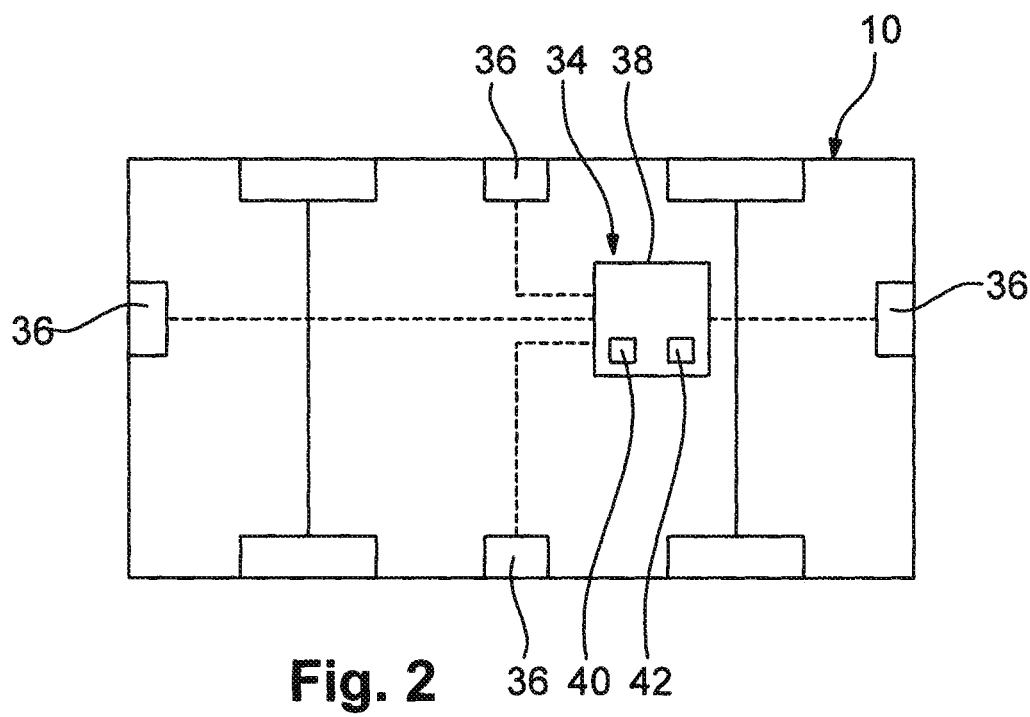
FIG. 2 shows a schematic block diagram of a system according to the invention for controlling a motor vehicle.

As shown in FIG. 2, the motor vehicle 10 has a system 34 for controlling the motor vehicle 10. The system 34 includes multiple sensors 36 and at least one control unit 38.

The sensors 36 are situated at the front, rear and/or sides of the motor vehicle 10, and are in each case designed to detect at least portions of the surroundings of the motor vehicle 10, generate corresponding surroundings data, in particular of the entire surroundings, and relay the data to the control unit 38. More precisely, the sensors 36 detect information at least concerning the current lane 14, the additional lanes 16, 18, and the further road users 20, 22, 24.

The sensors 36 are in each case a camera, a radar sensor, a distance sensor, a LIDAR sensor, and/or another type of sensor that is suitable for detecting the surroundings of the motor vehicle 10.

Alternatively or additionally, at least one of the sensors 36 may be designed as an interface with a guidance system that is associated at least with the section of the roadway 12 that is shown, and that is designed to transmit surroundings data to the motor vehicle 10 and/or to the further road users 20, 22, 24 via the roadway 12 and/or via the further road users 20, 22, 24. The one sensor 28 in this case may be designed as a mobile radio communication module, for example for communication according to the 5G standard.

In general, the control unit 38 processes the surroundings data received from the sensors 36 and controls the motor vehicle 10 based on the processed surroundings data, in an at least partially automatic manner, in particular fully automatically. Thus, a driving assistance system is implemented on the control unit 38 which is able to control a transverse motion and/or a longitudinal motion of the motor vehicle 10 in an at least partially automatic manner, in particular fully automatically.

Figure 3:
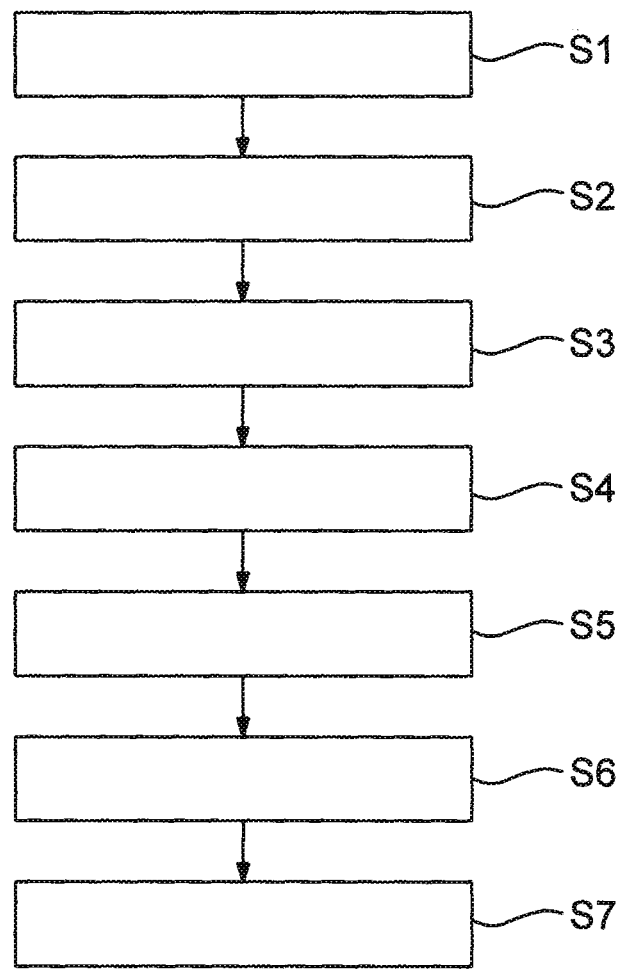
FIG. 3 shows a flow chart of the steps of a method according to the invention for controlling a motor vehicle.

For this purpose, the control unit 38 is designed to carry out the method steps explained below with reference to FIGS. 3 and 4. More precisely, the control unit 38 includes a data medium 40 and a processing unit 42, a computer program being stored on the data medium 40 and being executed on the processing unit 42, and the program code including means for carrying out the steps of the method explained below.

The roadway 12, more precisely, a representation of the current lane 14 and of the additional lane 16, based on the surroundings data received from the sensors 28, is initially transformed into a Frenet-Serret coordinate system (step S1).

Figure 4A:
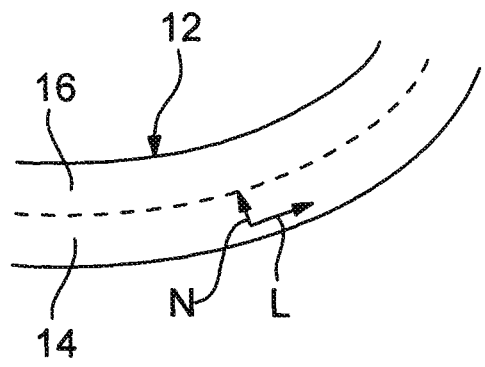
FIG. 4A schematically shows a roadway prior to a transformation into a Frenet-Serret coordinate system.
Figure 4B:
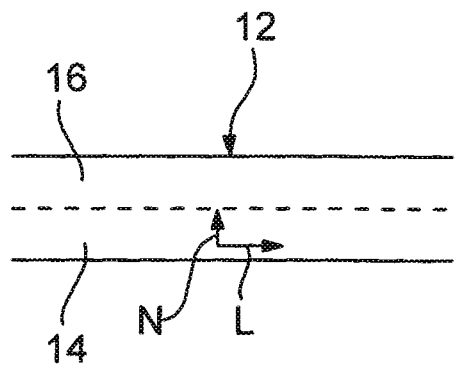
FIG. 4B schematically shows the roadway after a transformation into a Frenet-Serret coordinate system.

Step S1 is illustrated in FIG. 4. FIG. 4A shows the roadway 12 as it actually runs. In the example shown, the roadway, viewed in the longitudinal direction L, curves to the left. As the result of a local coordinate transformation the roadway 12 is transformed into the Frenet-Serret coordinate system, in which the roadway 12 is no longer curved, the result of this transformation being shown in FIG. 4B. As is clearly apparent, in this coordinate system the roadway 12 runs straight, without a curve, along the longitudinal direction L. The transverse direction N extends perpendicularly with respect to the longitudinal direction L.

Driving maneuver data are now received and/or generated by the control unit 38 (step S2), wherein the driving maneuver data contain information concerning multiple different driving maneuvers of the motor vehicle 10. In the example in question, the driving maneuver data thus contain information concerning multiple, in particular all, driving maneuvers that involve the motor vehicle passing the first further road user 20.

Here and in the following discussion, "possible" is understood to mean that the driving maneuver in question may be carried out without a collision, and also that the motor vehicle 10 is capable of performing it, i.e., that the motor vehicle 10 can, for example, accelerate and/or brake strongly enough to carry out the driving maneuver.

More precisely, the driving maneuver data involve the space-time trajectories of the motor vehicle 10 in the Frenet-Serret coordinate system, which correspond to the particular possible driving maneuvers.

In general, the received and/or generated driving maneuvers include more variants than the two driving maneuvers shown in FIG. 1 strictly by way of example, and preferably include all possible driving maneuvers for the motor vehicle 10.

The driving maneuver data may be generated by the control unit 38 based on the surroundings data received from the sensors 36. Alternatively or additionally, the driving maneuver data may be generated by the guidance system and relayed to the motor vehicle 10, more precisely, to the control unit 38.

In addition, traffic data are generated and/or received (step S3) by the control unit 38 which contain information concerning predicted trajectories of the further road users 20, 22, 24. The predicted trajectories are undisturbed trajectories, i.e., trajectories that the further road users 20, 22, 24 would follow if no disturbance took place due to a driving maneuver of the motor vehicle 10.

The traffic data may be generated by the control unit 38 based on the surroundings data received by the sensors 36. Alternatively or additionally, the driving maneuver data may be generated by the further road users 20, 22, 24 and/or by the guidance system and relayed to the motor vehicle 10, more precisely, to the control unit 38.

Only those further road users 20, 22, 24 that are situated in a predefined surroundings of the motor vehicle 10 are taken into account in step S3. In other words, only those road users 20, 22, 24 that can be influenced at all by at least one of the multiple driving maneuvers or that can have an influence on the selection of the driving maneuver are taken into account. For example, only those further road users 20, 22, 24 that are within the range of the sensors 36 are taken into account.

The influence of the various driving maneuvers on the trajectories of the further road users 20, 22, 24 is now determined, based on the driving maneuver data and the traffic data (step S4).

Here and in the following discussion, "influence" is understood to mean any deviation of the particular further road user 20, 22, 24 from the particular undisturbed predicted trajectory, for example a change in the speed, the direction, and/or the lane.

To ascertain the influence of the various driving maneuvers on the trajectories of the further road users 20, 22, 24, a simulation of the roadway traffic situation is carried out for the various possible driving maneuvers.

The undisturbed predicted trajectories, the various possible driving maneuvers of the motor vehicle 10, and/or corresponding trajectories of the motor vehicle 10 are inputs for the simulation. As output, the simulation generates adapted predicted trajectories for the further road users 20, 22, 24, wherein the adapted predicted trajectories contain the responses of the further road users 20 to the corresponding driving maneuver of the motor vehicle 10.

Lastly, based on the determined influence of the individual driving maneuvers on the trajectories of the further road users 20, 22, 24, a characteristic variable that describes the influence of the particular driving maneuver is ascertained for each of the possible driving maneuvers (step S5).

In general, the characteristic variable is a value of a variable or the values of multiple variables, wherein the variables assume a different value or values, depending on the driving maneuver of the motor vehicle 10 and depending on the adapted predicted trajectories.

In the exemplary embodiment shown, the characteristic variable is based on the kinetic energies of the motor vehicle 10 and of the further road users 20, 22, 24. It has been found that the kinetic energies are particularly suitable variables for describing the influence of the individual driving maneuvers and in general, the interaction of the particular driving maneuvers with the further road users 20, 22, 24.

With reference to the coordinate system illustrated in FIG. 1, the kinetic energy of the motor vehicle 10 is given by $$E_{KFZ}(t) = \tfrac{1}{2} m_{KFZ}(\dot{L}^2(t) + \dot{N}^2(t)),$$

where $m_{KFZ}$ is the mass of the motor vehicle 10. The kinetic energies of the further road users 20, 22, 24 result analogously to the above formula.

A standard mass $\hat{m}$ for each type of road user is introduced in order to simplify the handling of various types of road users and also to take into account the different braking and acceleration capabilities of different types of road users. Thus, in particular passenger vehicles, trucks, motorcycles, bicycles, pedestrians, etc., have different standardized masses.

The corresponding standardized kinetic energy for the road user number i is given by $$\hat{E}_i(t) = \tfrac{1}{2} \hat{m}_i(\dot{L}_i^2(t) + \dot{N}_i^2(t)),$$

where i=0 represents the motor vehicle 10, and i=1, 2, 3 represent the first further road user 20, the second further road user 22, and the third further road user 24, respectively.

Based on the standardized kinetic energy $\hat{E}_i$, a cost function $J_I$ is formed that describes the interaction of the individual driving maneuvers with the further road users 20, 22, 24. The cost function used is as follows:

$$J_I = \lambda \tilde{E}_{ego} + (1-\lambda) \tilde{E}_{OTP},$$

where $\tilde{E}$ is the normalized kinetic energy of the motor vehicle 10, and $\tilde{E}_{OTP}$ is the normalized kinetic energy of the further road users 20, 22, 24. More precisely, $J_I$ is a cost functional that is a function of the respective trajectories of the motor vehicle 10 and the further road users 20, 22, 24.

In addition, λ is a selectable real parameter that lies within the interval of 0 to 1 and that specifies how the normalized kinetic energy $\tilde{E}_{ego}$ of the motor vehicle 10 and the normalized kinetic energy $\tilde{E}_{OTP}$ of the further road users are weighted. For λ=1, for example only the motor vehicle 10 is taken into account, while for λ=0 only the further road users 20, 22, 24 are taken into account. In general, for λ>0.5 the motor vehicle 10 is more heavily weighted, while for λ<0.5 the further road users 20, 22, 24 are more heavily weighted.

The exact definitions of $\tilde{E}_{ego}$ and $\tilde{E}_{OTP}$ result from the following equations:

$$E_{i,prior}(t) = \tfrac{1}{2} \hat{m}_{(.)}\left(\dot{L}_{i,prior}^2(t) + \dot{N}_{i,prior}^2(t)\right),$$

$$E_{i,post}(t) = \tfrac{1}{2} \hat{m}_{(.)}\left(\dot{L}_{i,post}^2(t) + \dot{N}_{i,post}^2(t)\right),$$

$$\overline{|E_i(t)|} = \frac{1}{n_i}\sum_{j=1}^{n_i} \max(0, E_{i,prior}(t_j) - E_{i,post}(t_j))$$

$$\overline{|E_0(t)|} = \frac{1}{n_0}\sum_{j=1}^{n_0} \left| E_{0,prior}(t_j) - E_{0,post}(t_j) \right|$$

$$E_{OTP} := \frac{1}{M}\sum_{i=1}^{M} \overline{|E_i(t)|},$$

$$E_{ego} := \overline{|E_0(t)|},$$

$$E_{min} = \min(E_{OTP} - E_{ego}),$$

$$\hat{E}_{OTP} = E_{OTP} - E_{min},\ \hat{E}_{ego} = E_{ego} - E_{min},$$

$$\hat{E}_{max} = \max(\hat{E}_{OTP}, \hat{E}_{ego}),$$

$$\tilde{E}_{OTP} = \frac{\hat{E}_{OTP}}{\hat{E}_{max}},\ \tilde{E}_{ego} = \frac{\hat{E}_{ego}}{\hat{E}_{max}},$$

where $n_i$ is the number of time increments into which the driving maneuver is divided. M denotes the number of further road users 20, 22, 24, and in the example in question is equal to 3. The index "prior" describes the situation in which the motor vehicle 10 remains on the current lane 14 at its original speed. In contrast, the index "post" describes one of the possible driving maneuvers.

Alternatively or additionally, the cost function $J_I$ may include a penalty term that always adds a constant value for the cost function $J_I$ when a lane change of one of the further road users 20, 22, 24 is forced.

In order to select at least one of the various possible driving maneuvers, the cost function $J_I$ is now minimized (step S6). For this purpose, the cost functions $J_I$ for the multiple different possible driving maneuvers of the motor vehicle 10 are calculated and compared to one another.

At least the driving maneuver for which the cost function $J_I$ assumes the lowest value is selected, and the motor vehicle 10 is controlled by the control unit 38 according to the selected driving maneuver (step S7).

Optionally, a cost functional $J_V$ may be additionally created which assesses the costs of the particular driving maneuver for the motor vehicle, based on one or multiple conditions. For example, the cost functional $J_V$ includes one of the following conditions: the acceleration in the transverse and/or longitudinal direction should not exceed a predefined value, the vehicle should reach a certain target speed, and/or the urgency of a lane change of the motor vehicle 10, for example because the current lane 14 is ending.

The two cost functions $J_I$ and $J_V$ may then each be normalized in such a way that they assume values between 0 and 1 and are combined into a joint cost functional $J_T$ that describes the total costs of the particular possible driving maneuver. The cost functional $J_T$ has the following form:

$$J_T = \beta_1 \tilde{J}_V + \beta_2 \tilde{J}_I,$$

where and $\beta_1$ and $\beta_2$ are weighting factors and "~" denotes the particular normalized cost functional.

The cost functional $J_T$ is then minimized, analogously to the method described above, in order to select the driving maneuver according to which the motor vehicle 10 is to be controlled.

The invention claimed is:

1. A method for controlling a motor vehicle (10) traveling on a roadway (12) in a current lane (14), wherein the roadway (12) has at least one additional lane (16) that is adjacent to the current lane (14) of the motor vehicle (10), having the following steps:
generating and/or receiving driving maneuver data containing information concerning multiple possible, different driving maneuvers of the motor vehicle (10);
generating and/or receiving traffic data containing information concerning at least one undisturbed predicted trajectory of at least one further road user (20, 22, 24) situated in a predefined surroundings of the motor vehicle (10), in particular information concerning undisturbed predicted trajectories of multiple further road users (20, 22, 24) in the surroundings of the motor vehicle (10);
determining an influence of the at least one driving maneuver on the trajectory of the at least one further road user (20, 22, 24), in particular on the trajectories of the multiple road users (20, 22, 24), based on the driving maneuver data and the traffic data; and
ascertaining a characteristic variable that describes the influence of the at least one driving maneuver on the at least one further road user (20, 22, 24), based on the determined influence.

2. The method according to claim 1, wherein the characteristic variable is determined for multiple, in particular for all, of the possible driving maneuvers.

3. The method according to claim 1, wherein based on the ascertained characteristic variable, one of the multiple driving maneuvers is selected and the motor vehicle (10) is controlled according to the selected driving maneuver, in particular the selected driving maneuver being an optimal driving maneuver.

4. The method according to claim 1, wherein the characteristic variable includes a cost function that maps the particular driving maneuver and/or a change in the undisturbed predicted trajectory onto a cost factor, in particular the cost factor being greater when the at least one further road user (20, 22, 24) must decelerate, change direction, and/or change lanes.

5. The method according to claim 3, wherein the cost function is minimized in order to select the driving maneuver.

6. The method according to claim 4, wherein the cost function includes the kinetic energies of the motor vehicle (10) and of the at least one further road user (20, 22, 24).

7. The method according to claim 6, wherein the cost function ($J_I$) includes a change in the kinetic energies, i.e., the kinetic energy of the motor vehicle (10) and/or of the at least one further road user (20, 22, 24), between the particular possible driving maneuver and a situation in which the motor vehicle (10) remains in the current lane with unchanged speed.

8. The method according to claim 6, wherein for calculating the kinetic energies of different types of road users, a different, normalized mass is used for each type of road user.

9. The method according to claim 4, wherein the cost function includes a penalty term for forced lane changes by the at least one further road user (20, 22, 24).

10. The method according to claim 1, wherein at least the current lane (14) and/or the at least one additional lane (16, 18) are/is transformed into a Frenet-Serret coordinate system.

11. The method according to claim 1, wherein the possible driving maneuvers are optimized individual driving maneuvers.

12. The method according to claim 1, wherein at least one sensor (36) detects at least portions of the current lane (14) and/or of the additional lane (16, 18) in order to ascertain the driving maneuvers of the motor vehicle (10), generate the traffic data, and/or predict the trajectory of the at least one further road user (20, 22, 24).

13. A control unit (38) for a system (34) for controlling a motor vehicle (10), wherein the control unit (38) is designed to carry out a method according to claim 1.

14. A system (34) for controlling a motor vehicle (10), including a control unit (38) according to claim 13.

15. A computer program having program code means for carrying out the steps of a method according to claim 1, when the computer program is executed on a computer or a corresponding processing unit (42), in particular a processing unit (42) of a control unit (38).

16. A computer-readable data medium (40) on which a computer program according to claim 15 is stored.

* * * * *